July 29, 1958     R. H. JARVIS     2,844,948
TORQUE TRANSMITTING AND CUSHIONING MEANS
Filed Jan. 23, 1956     2 Sheets-Sheet 1
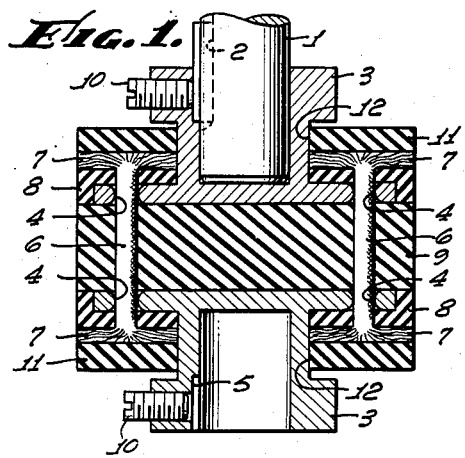
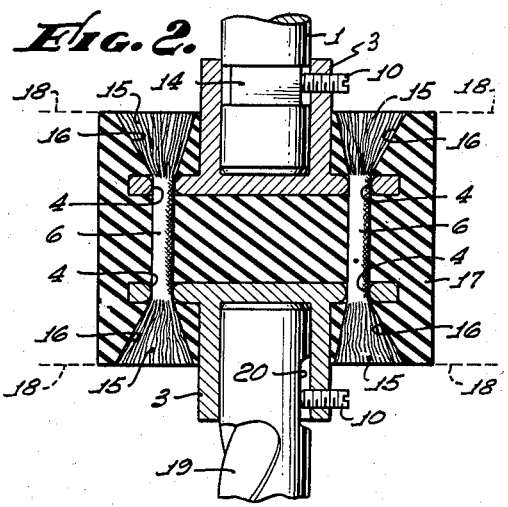
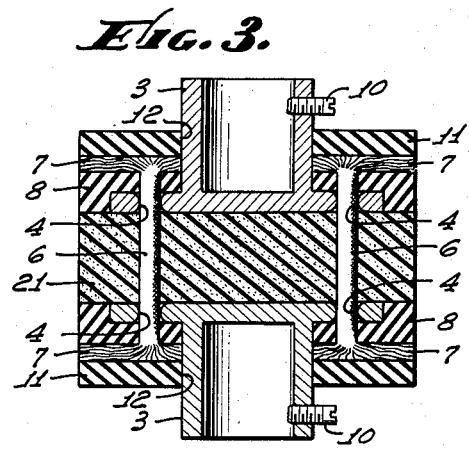
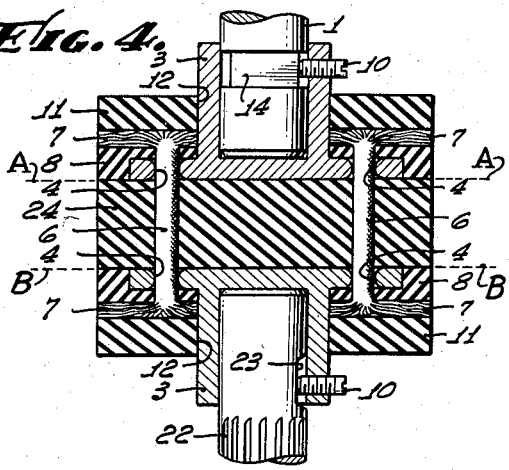
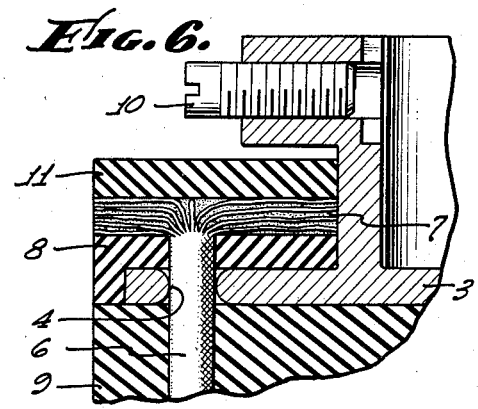
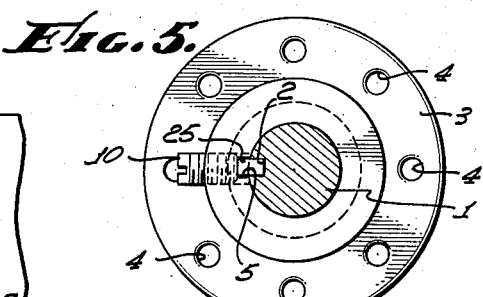
INVENTOR.
Ralph Herbert Jarvis July 29, 1958     R. H. JARVIS     2,844,948
TORQUE TRANSMITTING AND CUSHIONING MEANS
Filed Jan. 23, 1956     2 Sheets-Sheet 2
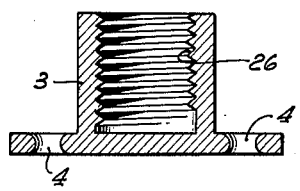
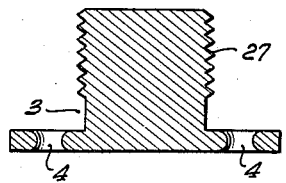
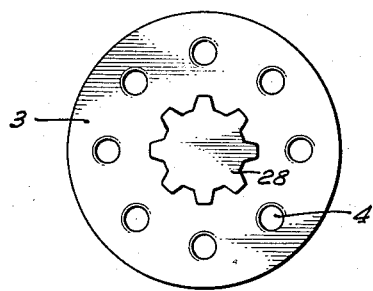
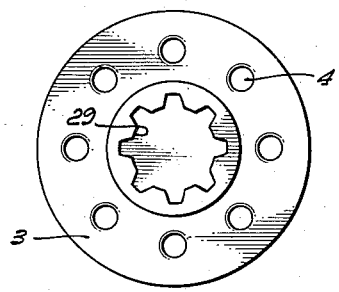
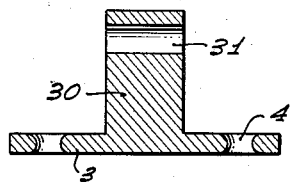
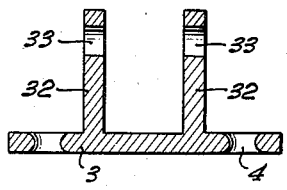
INVENTOR.
Ralph Herbert Jarvis United States Patent Office 2,844,948
Patented July 29, 1958

2,844,948

TORQUE TRANSMITTING AND CUSHIONING MEANS

Ralph Herbert Jarvis, Bell, Calif.

Application January 23, 1956, Serial No. 560,526

4 Claims. (Cl. 64—11)

This invention relates to a torque transmitting and cushioning means, and is a continuation-in-part of my pending application: Serial Number, 379,168, filed September 9, 1953, now Patent No. 2,761,298 granted Sept. 4, 1956; for, Flexible Drills and Flexible Reamers.

This invention is in part an improvement on British Patent Bates 567,553 February 20, 1945 and, likewise, on United States Patent Mesirow 2,542,154 Feb. 20, 1951.

I find that the flexible drill and reamer, as described and claimed by Bates 567,553 February 20, 1945, to be impractical and not suitable for certain classes of drilling and reaming operations.

The following is a partial list of the advantages of the present invention over Bates 567,553 and Mesirow 2,542,154:

(1) Shorter drills and reamers can be used in my invention; the high-speed steels whereof, drills and reamers are composed are expensive;

(2) By using shorter drills and reamers in my invention, less heat is generated in the flexible drills or flexible reamers, and, likewise, in the drill bushings, wherein the drills or reamers operate. Consequently, the drills, reamers and drill bushings used in my invention last longer, than drills, reamers and drill bushings used in Bates 567,553;

(3) Since I use shorter drills and reamers in my invention, than Bates 567,553, and generate less heat in my drills and reamers, I can run with a minimum of clearance between the drill or reamer and a drill bushing. It is very important to have a minimum of clearance between the drill or reamer, and a drill bushing, when locating accurate drill holes in precision drill jigs and precision guide templates; guide templates contain a great many accurately-located holes and are used in conjunction with automatic presses, such as Wiedemann, etc. By using my invention I can locate drill holes to closer tolerances in drill jigs and templates, than by using Bates 567,553;

(4) The flexible means, used in my invention is much stronger, than the flexible means described by Bates 567,553 and Mesirow 2,542,154.

(5) When using the flexible drills and flexible reamers, as described in my invention, since I use shorter drills or reamers, than Bates 567,553, I find that a rotating drill or reamer operates concentric with the driving means; i. e., or my drills or reamers have closer co-axial alignment, between the revolving drill or reamer and the driving member; whereas, in Bates 567,553 centrifugal force throws the end of the rotating drill from concentricity with the driving means; especially, drills or reamers revolving at high speed become unmanageable in Bates 567,553, and, likewise, in Mesirow 2,542,154.

(6) I can build a state of compressibility in the resilient material in my invention, whereas, it is impossible to build a state of compressibility in the resilient material in Bates 567,553 or Mesirow 2,542,154.

Other differences between Bates 567,553 and Mesirow 2,542,154, and the present invention will be obvious, during the description of the present invention.

The objects of the present invention are the following:

(1) The locating of precision drill holes in drill jigs and templates;

(2) The drilling of holes in difficult locations; i. e., holes that are drilled at present with angle-drilling attachments with portable drill motors, can be drilled with my invention without the use of said angle-drilling attachments;

(3) By using the present invention the drill bushings used, especially in aircraft jigs and fixtures, wear longer, than when using rigid drills or reamers;

(4) For transmitting power between a driving means and a driven means; i. e., the present invention can be used as a flexible coupling or torque transmitting means;

(5) The present invention can be used, as a flexible means on automatic screw machines for guiding drills, reamers and other tools during machining operations on automatic screw machines;

(6) The present invention can be used as a cushioning means under vibrating machines, such as automobile engines, air compressors, refrigerator compressors, etc;

(7) The present invention can be used as a universal joint on automobiles, tractors, road graders, diesel trucks, other motor vehicles, etc;

(8) The drilling of precision holes in manufacturing processes;

(9) Snubbers on automobiles and other motor vehicles to supplement springs;

(10) Springs in dies which actuate strippers;

(11) Springs in general on industrial equipment.

Other objects will be apparent from the following description and the accompanying drawings in which:

Figure 1 is an elevation, in section, the section being along the center thereof, of one embodiment of my invention;

Figure 2 is an elevation, in section, the section being along the center thereof; of an embodiment of my invention different from the embodiment shown in Figure 1;

Figure 3 is an elevation, in section, the section being along the center thereof; of an embodiment of my invention different from the embodiments of my invention shown in Figures 1 and 2;

Figure 4 is an elevation, in section, the section being along the center thereof; of an embodiment of my invention different from the embodiments of my invention shown in Figures 1, 2 and 3;

Figure 5 is a plan view of a metal member used in one embodiment of my invention;

Figure 6 is an elevation, in section, the section, being taken along the center thereof; of a metal member used in my invention; and, likewise, shows a partial sectional view of the resilient material and fibrous material used in my invention;

Figure 7 is an elevation, in section, the section, being taken along the center thereof; of a metal member used in one embodiment of my invention.

Figure 8 is an elevation, in section, the section being taken along the center thereof; of a metal member used in one embodiment of my invention;

Figure 9 is a plan view of a metal member used in one embodiment of my invention;

Figure 10 is a plan view of a metal member used in one embodiment of my invention;

Figure 11 is an elevation, in section, the section being taken along the center thereof; of a metal member used in one embodiment of my invention;

Figure 12 is an elevation, in section, the section being taken along the center thereof; of a metal member used in one embodiment of my invention.

Referring to Figure 1. 1 is a broken-off metal member, suitable for fixing a drill chuck of a portable electric or air drill thereto, or other suitable source of power. 2 is a keyway formed in member 1. 3 is a metal member with equidistant-spaced holes 4 formed therein; the edges of holes 4 have been rounded off and are smooth. 5 are keyways formed in members 3. 6 are cords, preferably of braided fibrous material, which pass through holes 4, in lower and upper members 3; the upper and lower ends of 6 have been frayed out and are numbered 7. 8 are layers of resilient material with holes formed therein; which coincide with holes 4 formed in upper and lower 3; the holes in the resilient material 8 are preferably smaller in diameter than the holes 4 in 3. 9 is a layer of resilient material with equidistant-spaced holes formed therein, which coincide with the holes 4, formed in lower and upper 3; fibrous material 6 passing through said holes formed in 9. 10 are setscrews in upper and lower 3. 11 are layers of resilient material, with holes 12 formed therein; the frayed out ends of 6, 7, are located between 8 and 11.

Referring to Figure 2. 1 is a broken-off metal member suitable for fixing a drill chuck of a portable electric or air drill thereto, or other suitable source of power. 10 is a set screw which applies pessure on shaft 1. Shaft 1 has been undercut and 14 is a flat spot formed on shaft 1; whereon set screw 10 applies pressure to prevent 1, revolving in 3. 3 are metal members with equidistant-spaced holes 4 formed therein; the edges of holes 4 have been rounded off and are smooth. 6 are, preferably, braided cords of fibrous material, which pass through holes 4 in upper and lower members 3; the upper and lower ends of 6 have been frayed out and are numbered 15; they occupy conical-shaped depressions 16. 17 is a body of resilient material, which is formed between the dotted lines 18, and is homogeneous in composition; conical-shaped depressions 16 are formed in 17; the lower and upper ends of 6 are frayed out in the conical depressions 16; the conical depressions are thereafter filled with a mixture of coarse rubber particles and rubber cement, which are dispersed in the frayed out ends 15 of the fibrous material 6. 19 is a broken-off twist drill with a flat spot 20 formed thereon; pressure of 10 on 20 prevents 19 from revolving in 3.

Referring to Figure 3. 3 are metal members with equidistant-spaced holes 4 formed therein; the edges of holes 4 have been rounded off and are smooth. 6 are, preferably, braided cords of fibrous material, which pass through holes 4 in upper and lower members 3; the upper and lower ends of 6 have been frayed out and are numbered 7. 8 are layers of resilient material with holes formed therein; which coincide with holes 4 formed in 3; the holes in 8 are, preferably, smaller than the holes 4 formed in 3. 21 is a layer porous or sponge rubber, placed between members 3 and 8. Holes have been formed in 21; wherethrough braided fibrous material 6 passes. 11 are layers of resilient material with holes 12 formed therein.

Referring to Figure 4. 1 is a broken-off metal member suitable for fixing a drill chuck of a portable electric or air drill thereto, or other suitable source of power. 10 is a set screw which applies pressure on shaft 1. Shaft 1 has been undercut, and 14 is a flat spot formed on shaft 1; whereon set screw 10 applies pressure to prevent 1 revolving in 3. 3 are metal members with equidistant-spaced holes 4 formed therein; the edges of holes 4 have been rounded off and are smooth. 6 are, preferably, braided cords of fibrous material, which pass through holes 4 in upper and lower members 3; the upper and lower ends of 6 have been frayed out and are numbered 7. 8 are layers of resilient material with holes formed therein; which coincide with holes 4, formed in 3. The holes in 8 are, preferably, smaller in diameter than the holes 4 formed in 3. 11 are layers of resilient material with holes 12 formed therein. 22 is a broken-off reamer, with flat spot 23 formed thereon; pressure of 10 on 23 prevents 22 from revolving in member 3. 24 is a layer of rubber which vulcanizes at a high temperature, with holes formed therein; wherethrough braided fibrous cords 6 pass. 24 occupies the area between dotted lines A and B. The upper and lower surfaces of 24 have had a thin layer of lower vulcanizing-point rubber vulcanized thereto, in a previous vulcanizing process, i. e., 24 may be a natural rubber with a high vulcanizing temperature, a synthetic rubber with a high vulcanizing temperature, a rubber composed of a mixture of natural rubber and synthetic rubber with a high vulcanizing point, etc. Later in the description of the present invention the reason for vulcanizing a thin layer of lower vulcanizing-point rubber onto the upper and lower surfaces of 24 will be described.

Referring to Figure 5. 1 is a section of a metal shaft suitable for fixing the chuck of a portable electric drill or air drill or other source of power, thereto. 2 is a keyway formed in 1. 3 is a metal member, with eight equidistant-spaced holes 4 formed therein; the edges of holes 4 have been rounded off and are smooth. 5 is a keyway formed in 3. 10 is a set screw which functions in internal screw threads formed in 3, thereby applying pressure on 25; 25 is a key which fixes 1 to 3.

Referring to Figure 6. 3 is a sectional view of a metal member used in one embodiment of my invention. 10 is a set screw which functions in internal screw threads formed in 3. 4 are equidistant-spaced holes formed in 3; the edges of holes 4 have been rounded off and are smooth. 6 is a broken-off cord of preferably braided fibrous material, which passes through 4. 7 the frayed out ends of 6, lay between layers of resilient materials 8 and 11.

Referring to Figure 7. 3 is a sectional view of a metal member used in one embodiment of my invention. 4 are equidistant-spaced holes formed in 3; the edges of holes 4 have been rounded off and are smooth. 26 are internal-right-hand screw threads formed in 3.

Referring to Figure 8. 3 is an elevation of a sectional view, the section being through the center thereof, of a metal member used in one embodiment of my invention. 4 are equidistant-spaced holes formed in 3; the edges of holes 4 have been rounded off and are smooth. 27 are external screw threads formed on 3.

Referring to Figure 9. 3 is a plan view, of a metal member used in one embodiment of my invention. 4 are equidistant-spaced holes formed in 3; the edges of holes 4 have been rounded off and are smooth. 28 are external splines formed on a metal projection on 3; see Figures 7 and 8, whereon 26 and 27 are formed on metal projections; 28 are external splines formed on a similar projection.

Referring to Figure 10. 3 is a plan view, of a metal member used in one embodiment of my invention. 4 are equidistant-spaced holes formed in 3; the edges of holes 4 have been rounded off and are smooth. 29 are internal splines formed in a metal projection on 3; see Figures 7 and 8, whereon 26 and 27 are formed on metal projections; 29 are internal splines formed in a similar projection.

Referring to Figure 11. 3 is an elevation of a sectional view, the section being through the center thereof, of a metal member used in one embodiment of my invention. 4 are equidistant-spaced holes formed in 3; the edges of holes 4 have been rounded_off and are smooth. 30 is an eye formed on 3. 31 is a hole, wherethrough a cylindrical pin functions.

Referring to Figure 12. 3 is an elevation of a sectional view, the section being through the center thereof, of a metal member used in one embodiment of my invention. 4 are equidistant-spaced holes formed in 3; the edges of holes 4 have been rounded off and are smooth. 32 is a yoke formed on 3; 33 are holes in coaxial alignment, wherethrough a cylindrical pin functions.

Referring to all the figures in the present invention. The types of ends of the members 3 used in torque transmitting and cushioning means vary considerably; i. e., Figures 1 and 5 show ends 3 wherein cylindrical shafts are driven by means of metal keys 25 fixed by set-screws 10. Figures 2, 3 and 4 show ends wherein the driven and driving ends 3 are identical. In application of the present invention the ends of the torque transmitting or cushioning means 3 may be identical, or they may vary; i. e., one end may employ a key-way 2 as shown in Figure 1, and the other end may be a yoke 32 as shown in Figure 12; or an external spline 28, as shown in Figure 9. Or I may employ an eye 30, as shown in Figure 11 on one end 3, and an internal-right-hand screwthread 26, as shown in Figure 7 on the other end 3.

The figures in the present invention show the common means 3 employed for applying torque transmitting and cushioning means; there are other means 3 besides those shown. In the present invention I may employ any combination of means 3 for using the present invention, as a torque transmitting or cushioning means; it is old in the art of applying torque transmitting or cushioning means to use identical or dissimilar ends.

Referring to Figures 1, 2, 3, 4 and 6. I find it preferable to build a state of compressibility in the resilient material employed in my invention for the following reasons:

(1) First, the ends 3 of the torque transmitting means will revolve in co-axial alignment;

(2) Second, the tension is equal on all the fibers in the fibrous material employed in my invention;

(3) The present invention is stronger;

(4) The present invention lasts longer.

Referring to Figure 4, wherein are dotted lines A—A and B—B; there is a layer of rubber between lines A—A and B—B; this is the rubber that is in a state of compressibility in the present invention. See Figure 3, wherein 21 is a layer of porous or sponge rubber; the porous or sponge rubber is preferably in a state of compressibility. See Figure 2; the rubber between upper and lower members 3 is in a state of compressibility. See Figure 1, wherein 9 is a layer of rubber; the rubber in 9 is preferably in a compressed state.

In the present invention, in regards to the resilient material used therein; I may use synthetic rubber or natural rubber; or mixtures of synthetic and natural rubber. Again, I may employ resilient materials, such as cloth, felt, leather, etc.; substances which are not classified as rubbers. Again, I may employ different rubbers in laminar construction or in layers; the layers being composed of the same or dissimilar rubbers. Furthermore, I may employ materials in laminar construction or in layers, some of the layers may be rubbers, and other layers may be cloth, felt, leather, etc.; i. e., I may employ layers of natural rubber and between the layers of natural rubber I may employ a layer of nylon fabric, nylon cloth, etc. Again, I may employ layers of synthetic rubber with a layer of orlon cloth, orlon fabric, etc., between them etc. A great many different classes of resilient materials can be used in laminar construction in the present invention.

In regards to the fibrous material employed in the present invention, which passes through holes 4 in the flanges. See Figures 1, 2, 3, 4 and 6, wherein 6 is braided fibrous material, which passes through holes 4; the upper and lower ends of 6 being frayed. In the present invention I may employ braided fibrous material consisting of nylon, orlon, linen, cotton, etc.; or I may employ mixtures of different fibrous materials in braided construction. Furthermore, I may employ fibrous material or materials which are not braided.

Additionally, I may employ fibrous material or materials, which are partly braided and partly of other construction; i. e., on aircraft parachutes there are nylon cords, which extend from the parachute to the life belt. These nylon cords, I find, make an exceptionally strong torque transmitting and cushioning means, when employed as fibrous material in the present invention. These nylon parachute cords are composed of partly braided nylon fibers, and partly rolled nylon fibers; i. e., the outer portion of these nylon parachute cords is of braided-tubular construction; within this braided tube there are about eight small rolled cords of nylon; the outer braided tube acts as a protecting member for the small rolled cords of nylon fibers therein. These nylon parachute cords have a tensional strength of approximately 1500 pounds. Likewise, these nylon parachute cords are exceptionally flexible; on account of the inner rolled cords are not connected in any manner to the outer braided tubular section of the parachute cord. I may employ nylon cords, of the same construction as parachute nylon cords, the diameter thereof, being larger or smaller than the parachute nylon cords, as at present manufactured.

Additionally, I may employ several cords through each hole 4 in the present invention. See Figures 1, 2, 3, 4 and 6 wherein 6 are cords of fibrous material. In the figures I only show one braided cord. I may employ a multiplicity of cords passing through each hole 4; and the cords may be of any fibrous material or materials; and may be of braided, rolled, etc., construction; or combinations of two or more constructions.

In regards to using the present invention as an angle-drilling attachment; see Figures 1, 2, 3 and 4. I find, provided the resilient material, between the flanges on 3, is increased in thickness; i. e., see Figure 4; provided the thickness of the resilient material between lines A—A and B—B is increased then the present invention is more flexible. Likewise, I find provided the compressibility is reduced to the minimum the present invention functions better, as an angle-drilling attachment. Additionally, I find provided the resilient material is exceptionally resilient; i. e., soft rubber, such as sponge or porous rubber is used between the flanges on 3, the present invention functions better as an angle-drilling attachment; see Figure 3, wherein the rubber 21 is sponge of porous rubber.

In regards to the number of layers of resilient material to use in the present invention; above and below the flanges on 3; i. e., see Figures 1, 3 and 4, wherein 8 and 11 are layers of resilient material above and below the flanges on 3. Only one layer of resilient material 11 is shown above the frayed out ends 7; see Figures 1, 3 and 4. In the present invention, especially, whenever a multiplicity of cords of fibrous material pass through holes 4, I may employ a multiplicity of layers of resilient material 11; and between each layer 11, there are frayed out ends 7.

In regards to the thickness of the resilient material above and below the flanges on 3; whenever the present invention is used as a cushioning means, i. e., as springs in general, snubbers in general, etc. See Figures 1, 2, 3 and 4 in the present invention in regards to the thickness of the resilient material above and below the flanges on 3. Whenever the present invention is used as a cushioning means, I find it is necessary to employ thick layers of resilient material above and below the flanges on 3.

In regards to the means of fixing, the frayed out ends of the fibrous material in the resilient material or materials, above and below the flanges on 3. See Figures 1, 3, 4 and 6 in regards to the frayed out ends of the fibrous material 7; and, likewise, see Figure 2 relative to 15 the frayed out ends of 6. There are two methods of fixing fibrous material or materials in resilient materials, depending somewhat on the chemical constituents of the resilient material or materials.

Whenever the resilient material or materials employed in the present invention, are natural or synthetic rubbers, or mixtures of synthetic and natural rubbers, then cementitious or vulcanizing processes can be used to fix resilient material or materials to fibrous material or materials or metals. Taken as a whole, vulcanizing processes are stronger than cementitious processes, when employed in the present invention, whenever rubbers are employed, as resilient material or materials, and rubbers are bonded to fibrous material or materials and metals.

In the following paragraphs, I will describe the use of cementitious and vulcanizing processes in fixing the resilient material or materials, fibrous material or materials and metal members employed in the present invention.

Referring to Figures 1, 3, 4 and 6; these figures show laminar construction in fixing the component parts of the present invention. I may use cementitious or vulcanizing processes. Firstly, I will describe cementitious processes in general, in fixing the component parts of the present invention in Figures 1, 3, 4 and 6;

First, I cement the layers of rubber 8 to the flanges on 3, with a cement suitable for fixing rubbers to metal; I find the following cement, described as follows; "Chrysler Cement Part No. 1,316,241, Mopar, General Purpose Cement, Manufactured by Chrysler Corporation," to be exceptionally good, when used in the present invention. The above described cement is a trim cement, and, there are other trim cements, manufactured and sold that are, likewise, suitable when employed in the present invention. Trim cements are used to cement rubber trim around the doors of automobiles, windows of automobiles, etc;

When the cement applied to the layers 8 and the flanges 3 has set and dried, I pull the braided members 6 through holes 4. I follow the procedure in using the trim cement, as advocated in the instructions printed on the container, thereof;

In the following description when the numbers 11, 7, 8 and 4 are used; they refer only to the upper numerals 11, 7, 8 and 4 on Figures 1, 3 and 4;

Next, I fray out the ends of 6, thus creating the frayed out ends 7;

Then I apply a layer of cement to 7 and the upper surface of 8;

Next, I apply a layer of cement to one surface of 11; When the above layers of cement have dried to the right consistency; I place the layers 11 cemented side down, as shown in the Figures 1, 3, 4 and 6;

Next, I press down firmly on top of the layers 11; and then I let the cement thoroughly dry. When the cement has thoroughly dried, I place the partially assembled invention in a drying oven and heat the same to about 200 degrees Fahrenheit for about two hours; this sets the cement thoroughly;

Next, see Figures 1 and 3. I put both ends in an assembly fixture. The assembly fixture holds the ends 3 in co-axial alignment. In the assembly fixture I complete the assembling of the present invention; and the resilient material see Figure 1, wherein 9, and the resilient material see Figure 3, wherein 21; 9 and 21 are the resilient materials between the flanges on 3. 9 or 21 is put in a compressed state in the assembly fixture by the use of proper clamps and plates. 9 or 21 is maintained in a compressed state during the assembling of the present invention. During the assembly of the present invention the various fibrous and resilient materials are properly cemented together, with a proper cement;

When the above cemented procedure has been completed the assembly fixture holding the present invention is placed in an oven; and heated to about 200 degrees Fahrenheit for about two hours. Then the assembly fixture containing the present invention is removed from the oven, and allowed to cool to about room temperature. Thereafter, the present invention is removed from the assembly fixture. When the present invention is removed from the assembly fixture, the resilient material 9 see Figure 1, or the resilient material 21 see Figure 3, are in a compressed state;

When the present invention is removed from the assembly fixture, the invention is not cylindrical shaped; it is somewhat larger in the center, than at the ends. Thereafter, the ends of the present invention are held in co-axial alignment, and the excess resilient material is ground off with a high-speed revolving coarse emery wheel. When the excess resilient material has been ground off, the present invention is cylindrical shaped, as shown in Figures 1, 2, 3 and 4; or a round solid cylinder;

In a future patent application on the present invention, drawings showing the above-mentioned assembly fixture, and a complete description of its use will be given.

Referring to Figure 4. 24 is the layer of rubber between the flanges on 3. I find, provided the layer of rubber 24 has a very high vulcanizing temperature, and then layers of rubber with a somewhat lower vulcanizing temperature have previously been vulcanized on the upper and lower surfaces of 24, before 24 is used in the present invention, then it is possible to vulcanize the resilient and fibrous materials used in the present invention, and; likewise, have a state of compressibility in 24, when the present invention is removed from the assembly fixture. In a future patent application on the present invention a complete description of the above procedure will be described.

Referring to Figure 2. In Figure 2, in the present invention the resilient material is homogeneous in composition, and, likewise, the resilient material has been vulcanized to the members 3. To produce the present invention, as shown in Figure 2, I find it necessary to use two different methods, during the manufacturing procedure; and they are as follows:

First, the ends 3 are put in a rubber mold and held in co-axial alignment. In the rubber mold metal pins are run through the holes 4; on the ends of the metal pins removable conical-shaped metal cones fit. The mold is then filled with uncured rubber; and the mold, thereafter, is brought to the proper vulcanizing temperature, and held at this temperature until the rubber in the mold is cured;

Then the present invention, see Figure 2, is removed from the mold and the metal pins and conical-shaped metal cones are removed from the cured rubber;

Next, the invention is put in an assembly fixture and the ends 3 are held in co-axial alignment in the assembly fixture;

Then one end 3, see Figure 2, wherein 16 are conical-shaped depressions, is filled with a mixture of coarse rubber particles and a proper cement; the frayed-out ends 15, of cords 6 are dispersed in the above mixture of coarse rubber particles and cement as shown in Figure 2. The angle of the conical-shaped depressions 16 is determined by the angle of the conical-shaped metal cones used; see lines 23 and 24 on page 16 in regards to the conical-shaped metal cones, in the rubber molds. The angle of the depressions, may be 60 degrees, 65 degrees, 80 degrees, 90 degrees, etc.;

Next, the assembly fixture; containing the present invention, wherein all the depressions 16 on one end have been filled with a mixture of coarse rubber particles, cement and frayed-out ends 15; is placed in a drying oven;

When the cement has thoroughly dried in the drying oven, the temperature of the drying oven is raised to about 200 degrees Fahrenheit for about two hours;

Next, the assembly fixture; containing the present invention is removed from the drying oven;

When the present invention has cooled somewhat, the rubber between flanges 3 is compressed by applying pressure on the same in the assembly fixture;

Next, the cords 6 are cut off and the ends thereof are frayed out; see Figure 2; wherein cords 6 show both ends frayed out in depressions 16;

Then a mixture of cement and coarse rubber particles are used to fill up the depressions 16 containing the frayed-out ends 15;

Next, the assembly fixture, containing the present invention is placed in a drying oven. When the cement has dried thoroughly; the temperature of the drying oven is raised to about 200 degrees Fahrenheit for about two hours;

Next, the assembly fixture is removed from the oven, and, when the present invention has cooled to about room temperature, the invention is removed from the assembly fixture;

The present invention is now approximately, as shown in Figure 2; and the resilient material 17 is in a state of compression between the flanges on 3;

Next, the ends 3 are held in co-axial alignment in a fixture; and the excess rubber is ground off by a high-speed revolving emery wheel;

The present invention is now exactly as shown in Figure 2, and the resilient material 17 between the flanges on 3 is in a state of compression;

As can be readily understood, means other than conical-shaped depressions 16 may be employed to fix the ends of cords 15 in the present invention; i. e., cylindrical-shaped depressions could have been employed, layers of resilient material could have been employed. The above example illustrates a means of part vulcanizing and part cementitious processes in manufacturing the present invention, as shown in Figure 2.

As can be readily understood in the present invention, the state of compressibility of the resilient material between the flanges on 3 can be varied by varying the pressure in the assembly fixture.

In the present invention I only show, see the figures in the present invention, circular flanges with a plurality of holes 4 therein. As can be readily understood, in cushioning means, I may employ square-shaped flanges, parallelogram-shaped flanges, elliptical-shaped flanges, etc., with a plurality of holes 4 therein.

Having described my invention, I declare that what I claim and desire to secure by Letters Patent is:

1. A flexible coupling comprising a body of resilient enveloping material, longitudinally spaced internal circular elements in co-axial alignment in said body, said longitudinally spaced internal circular elements having a plurality of holes therein, the edges of said holes being rounded and smooth, fibrous material passing through said holes the ends of said fibrous material being frayed in the resilient material, an element fixed to the center of one of said longitudinally spaced internal circular elements suitable for a driving means, an element fixed to the center of the other said longitudinally spaced internal circular element suitable for a driven means, said element suitable for a driving means and said element suitable for a driven means being in co-axial alignment and said resilient enveloping material being in a state of compression between said circular elements.

2. A flexible coupling comprising a body of resilient enveloping material of laminar construction, longitudinally spaced internal circular elements in co-axial alignment in said body, said longitudinally spaced internal circular elements having a plurality of holes therein, the edges of said holes being rounded and smooth, fibrous material passing through said holes the ends of said fibrous material being frayed in the resilient material of laminar construction, an element fixed to the center of one of said longitudinally spaced internal circular elements suitable for a driving means, an element fixed to the center of the other said longitudinally spaced internal circular element suitable for a driven means, said element suitable for a driving means and said element suitable for a driven means being in co-axial alignment and said resilient enveloping material of laminar construction being in a state of compression between said circular elements.

3. A cushioning means comprising a cylindrical resilient structure formed with respective co-axially disposed elements in the opposite ends thereof, said elements being suitable to attach other elements thereto, said disposed elements being located centrally on circular flanges having a plurality of holes therein, said disposed elements and said flanges being spaced longitudinally and co-axially in said cylindrical resilient structure, the edges of said holes in said flanges being rounded and smooth, fibrous material passing through said holes the ends of said fibrous material being frayed in said resilient structure, and the resilient material in said resilient structure being in a compressed state between said circular flanges.

4. A cushioning means comprising a cylindrical body of resilient enveloping material of laminar construction, said cylindrical body having respective co-axially disposed elements in the opposite ends thereof, said elements being suitable to attach other elements thereto, said disposed elements being located centrally on circular flanges having a plurality of holes therein, said disposed elements and said flanges being spaced longitudinally and co-axially in said cylindrical body, the edges of said holes in said flanges being rounded and smooth, fibrous material passing through said holes the ends of said fibrous material being frayed in said cylindrical body and the resilient material in said cylindrical body being in a compressed state between said circular flanges.

References Cited in the file of this patent

UNITED STATES PATENTS

| 1,867,484 | Wolfe et al. | July 12, 1932 |
| 2,761,298 | Jarvis | Sept. 4, 1956 |